United States Patent Office 3,163,636
Patented Dec. 29, 1964

3,163,636
GENUINE ESCIN FROM HORSE CHESTNUT EXTRACTS, AND PROCESS OF PRODUCING SAME
Josef Wagner and Joachim Bosse, Munich, Germany, assignors to Chemisch-Pharmazeutische Fabrik Adolf Klinge & Co., Munich, Germany, a corporation of Germany
No Drawing. Filed June 13, 1961, Ser. No. 116,676
Claims priority, application Germany, June 14, 1960, C 21,672
8 Claims. (Cl. 260—210.5)

The present invention relates to an improved process of producing escin from horse chestnut extracts and more particularly to a process of producing genuine escin from such extracts, which escin is especially useful for therapeutical purposes, and to such new and improved genuine escin and its metal salts.

It is known that extracts of the horse chestnut tree and especially extracts of seeds of the horse chestnut tree contain a saponin which is commonly designated as escin. It is also known that said saponin has a therapeutically valuable anti-edematous effect. Heretofore, the saponin has been obtained from extracts of the horse chestnut tree by various methods, for instance, by a treatment with acids or by subjecting the extracting to the action of ion-exchange agents. Such known treatments, however, yield saponin-fractions of varying quality.

Another process of producing the escin saponin consists in precipitating the saponin by the addition of cholesterol and subsequently splitting the cholesterol-saponin adduct by heating to boiling in xylene of the boiling point of about 140° C.

All these known methods, however, do not yield a genuine saponin as it forms the component of the saponin compound in the horse chestnut tree. Heretofore, it was impossible to produce a saponin of uniform quality and as a result thereof its therapeutic usefulness is limited.

It is one object of the present invention to provide a process of separating the substantially pure genuine saponin escin from horse chestnut extracts with a good yield and of uniform quality so that it is of high therapeutical value.

Another object of the present invention is to provide a simple and effective process of producing such a genuine escin of uniform quality from horse chestnut extracts.

Other objects of the present invention and advantageous features thereof will become apparent as the description proceeds.

The process according to the present invention consists in first precipitating the cholesterol-escin adduct by treating an aqueous-alcoholic horse chestnut extract with cholesterol, separating said precipitated adduct from the extract, and extracting said precipitated adduct thoroughly with ether until no more change in weight is observed. Thereby, the cholesterol is split off and the insoluble horse chestnut saponin remains in substantially pure and unchanged condition. It is further purified by dissolution in a solvent, for instance, in methanol, and treating the solution, if required, with activated charcoal or the like.

When evaporating the solvent, for instance, methanol, the resulting solid product is substantially pure genuine escin which is free of other saponins. Said genuine escin is very sensitive against increases in temperature. Thus, for instance, drying of escin at 100° C. yields degradation products as can be proved by paper chromatography. The free acid of said genuine escin is split up in aqueous solution, even at a temperature of only 60° C., into two isomers.

The genuine escin according to the present invention is water soluble in the form of its free acid. It has a specific optical rotation and differs in this respect, from the saponins isolated heretofore from horse chestnut extracts which do not represent such a genuine escin.

Another difference over the known saponins is its stability. No hydrolytic cleavage takes place when storing the genuine escin according to the present invention in aqueous solution.

The first step of the present process, namely the precipitation of an adduct of the horse chestnut saponin and cholesterol has been used for the preparation of horse chestnut extracts which are free of said saponin and which can be injected into the blood stream without any danger of hemolysis. However, the thereby precipitated and separated adduct of cholesterol and saponin has not been further investigated.

According to the present invention it has been found that cholesterol has a highly selective precipitating effect upon the horse chestnut saponins and thus permits the preparation of the genuine saponin escin in substantially pure form and free of other horse chestnut saponins by extracting the cholesterol-saponin adduct with ether under mild conditions, i.e., at room temperature or at a low temperature not substantially exceeding 35° C. (boiling temperature of ether).

The saponin which has been extracted from the seeds of the horse chestnut tree (*Aesculus hippocastanum* L.) possesses valuable therapeutic properties. Therefore, many methods of producing such saponins in a substantially pure form have been described. However, due to the high water solubility and the very similar behavior of the accompanying substances, such as the flavonol glycosides, it was heretofore not possible to isolate the horse chestnut saponins in an unchanged form. Precipitation by means of lead salts and/or ether, dialysis, hydrolysis by means of acids, or treatment with ion exchange agents, as they were commonly used heretofore, yielded only fractions of such saponins or degradation products which are not identical with the genuine horse chestnut saponin escin as is evident from their different melting points, solubility properties, optical rotation values, or hemolytic indices.

In contrast thereto, when proceeding according to the present invention, a white, highly hygroscopic compound of the melting point 250–252° C. is obtained which is, as is evident from its analysis, the sodium salt of the saponin acid escin. When passing an aqueous solution of said sodium salt through a cation exchange agent, the free water soluble acid of the melting point 222–223° C. is obtained.

Analysis of escin in its acid form: $C_{54}H_{84}O_{23} \cdot H_2O$; molecular weight: 1119.3. Calculated: 57.95% C; 7.74% H. Found: 58.03% C; 7.74% H.

Optical rotation: $[\alpha]_D^{27} = -18.1°$ (concentration: 5% in absolute methanol); hemolytic index: 1:30,000.

One molecule of escin contains one molecule each of escigenin, α-methyl-β-hydroxy butyrate, acetate, xylose, glucose, and glucuronic acid, as well as water of crystallization.

As stated above, the compound is present in the horse chestnut extract in the form of its stable sodium salt. When dissolving the free acid in water and heating the aqueous solution, it is split up into a readily soluble isomer and a difficultly soluble isomer. The genuine saponin is readily soluble in water and methanol in its sodium salt form, slightly soluble in acetone, and insoluble in ether and hydrocarbons. On shaking its aqueous solution a vigorous foam is formed even in dilutions of 1:20,000. The compound has a bitter taste, causes severe irritation of the mucous membranes, and has a first dilatating and then contracting effect upon the vascular system.

It is highly useful in therapy. It inhibits not only edema formation, but also capillary fragility. It is capable of favorably affecting histamin asthma.

In contrast to known processes of producing horse chestnut saponins, the process according to the present invention has considerable advantages. It permits almost quantitative precipitation of the adduct from a neutral to weakly acid aqueous or aqueous-alcoholic horse chestnut extract by means of the selective precipitating agent cholesterol which may be used in solid or dissolved form. In general, precipitation is completed within one hour. The washed and dried cholesterol-saponin adduct can be split up under very mild conditions, excluding any harmful effects upon the saponin, by a treament with ether, whereby cholesterol is dissolved and completely removed from the insoluble genuine saponin.

The following examples serve to illustrate the present invention without, however, limiting the same thereto.

*Example 1*

An ethereal solution of 1 kg. of cholesterol is added to 100 kg. of a 10% aqueous-alcoholic horse chestnut extract. The resulting emulsion is stirred at 90° C. for one hour, while the ether is distilled off. The water insoluble saponin-cholesterol precipitate is centrifuged and washed with cold water until the wash water is colorless. The precipitate is air-dried at room temperature. The resulting dust-fine powder is extracted with ether in a Soxhlet apparatus for 10 days. The residue is treated with 20 kg. of methanol and the undissolved material is filtered off. The yellowish methanol solution is treated with activated charcoal until it is colorless. The methanol is distilled off in a vacuum, and the residue is dried over phosphorus pentoxide in a vacuum not exceeding 1 mm. Hg. The yield of substantially pure sodium escinate obtained thereby is about 0.8 kg., i.e., 8%.

*Example 2*

One kg. of finely comminuted cholesterol is suspended in 100 kg. of a 10% aqueous horse chestnut extract and the suspension is stirred at 90° C. for one hour. The water insoluble saponin-cholesterol precipitate is centrifuged and washed with cold water until the wash water is colorless. It is then air-dried at room temperature. The dust-fine powder is washed three times with ether, each time with about 5 kg. of ether in order to remove most of the cholesterol. The remaining powder is thoroughly extracted in a Soxhlet apparatus with ether for 7 days and the residue is treated as described in Example 1.

To purify the saponin obtained by ether extraction of the cholesterol-saponin adduct, there may be used, in place of methanol, other organic solvents, such as water or ethanol, propanol or butanol for dissolving the ether-extracted saponin.

Treatment with activated charcoal or with decolorizing carbon is advisable if the methanol or the like solution is colored.

In place of the sodium salt of escin, there may be prepared other salts, such as the potassium, lithium, calcium, magnesium or manganese salts or salts with organic bases such as aminopurine, derivatives of choline, ethylamines, phenyl and ethyleneamines. The salts are preferably obtained by reacting the escin with the equimolecular amount of the respective metal hydroxide or carbonate in a suitable solvent and isolating the salts.

The following salts were prepared in this manner: sodium, potassium, calcium, choline and ethylenediamine-escinate.

To prepare the free acid of the genuine escin the sodium salt is dissolved in water, the solution is treated with a cation exchange agent, preferably a strong acid agent, e.g., by passing the solution through a cation exchange column and the water of the effluent solution is removed by evaporating under reduced pressure at 30° C.

To prepare an escin of highest purity treatment with charcoal etc. is necessary. The escin prepared according to the invention comprises one mole of xylose, one mole of glucose and 1 mole of glucuronic acid. In the free acid form, escin is soluble in water. The escin in aqueous solution splits up into two isomers on standing or heating into two isomers.

The splitting up of the saponin-cholesterol precipitate by treating with ether can be made complete even by using relatively low temperatures, e.g., 70° C. without damaging the escin and changing the hemolytic indices. Allowing solutions of escin to stand in acid or alkaline medium is to be avoided to prevent degradation and other damaging of the escin.

It is to be noted that $\alpha$-methyl-$\beta$-hydroxy butyrate (page 5, line 27 of the description) and "acetate" means $\alpha$-methyl-$\beta$-hydroxy butyric acid or acetic acid which are combined with the escigenin molecule by ester bonding with the hydroxyl group of the escigenin. The sugars are bonded to the escigenin molecule by glucosidic bondings.

The genuine escin inhibits edema formation, respectively reduces manifest edema, i.e., stasis edema (e.g., with varicose veine and postthrombotic syndrome), congestion edema (e.g., posttraumatic swelling of soft tissue, lymphedema), cerebral edema (e.g., in brain injuries, brain tumors) and toxic edema (e.g., edema of lungs). Escin enhances capillary resistance, respectively reduces capillary fragility, suchas in hypertension. Finally bronchial asthma of allergic origin is influenced by escin.

Clinical administration by intravenous injection. Dosage 2–4 mg. per dose, up to 10 mg. daily.

We claim:

1. In a process of producing the substantially pure genuine horse chestnut saponin escin, the steps which comprise mixing an aqueous horse chestnut extract with cholesterol, while heating, until the aqueous solution is substantially free of hemolytic activity, separating the resulting saponin-cholesterol precipitate from the solution, and exhaustively extracting the precipitate with ether, until free of cholesterol.

2. In a process of producing the substantially pure genuine horse chestnut saponin escin, the steps which comprise mixing an aqueous-alcoholic horse chestnut extract with cholesterol, while heating, until the aqueous solution is substantially free of hemolytic activity, separating the resulting saponin-cholesterol precipitate from the solution, and exhaustively extracting the precipitate with ether, until free of cholesterol.

3. The process according to claim 1, wherein cholesterol in ethereal solution is added to said aqueous extract prior to said mixing.

4. The process according to claim 1, wherein cholesterol is added in finely comminuted solid form to said aqueous extract prior to said mixing.

5. The process according to claim 1, wherein said extract is heated to a temperature of about 90° C.

6. The process according to claim 1, wherein the saponin-cholesterol precipitate is washed with water until the wash water is colorless, and air-dried prior to said extracting with ether.

7. The process according to claim 1, wherein the cholesterol-free ether-extracted precipitate is purified by dissolution in methanol, filtering off undissolved material, removing the methanol by vacuum distillation, and drying the residue at room temperature.

8. The process according to claim 1, wherein the cholesterol-free ether-extracted precipitate is purified by dissolution in methanol, filtering off undissolved material, treating the methanolic solution with activated charcoal, removing the methanol by vacuum distillation, and drying the residue at room temperature.

References Cited in the file of this patent

UNITED STATES PATENTS 2,790,793    Boedecker _____ Apr. 30, 1957

OTHER REFERENCES

Kandatu: Chemical Abstracts, volume 35, 1941, page 17949.

Kondo: Chemical Abstracts, volume 24, 1930, page 5868.

Ludewig et al.: Chem. Abst., vol. 53, 1959, p. 7291(g).